March 18, 1958 R. McN. BOWIE 2,827,591

CATHODE RAY SCANNING SYSTEMS

Filed Dec. 23, 1954 2 Sheets-Sheet 1

INVENTOR
ROBERT M. BOWIE
BY J. Albert Hultquist
ATTORNEY

March 18, 1958 R. McN. BOWIE 2,827,591

CATHODE RAY SCANNING SYSTEMS

Filed Dec. 23, 1954 2 Sheets-Sheet 2

INVENTOR
ROBERT M. BOWIE
BY J. Albert Hultgren
ATTORNEY

United States Patent Office 2,827,591

Patented Mar. 18, 1958

2,827,591

CATHODE RAY SCANNING SYSTEMS

Robert McNeil Bowie, Manhasset, N. Y., assignor to Sylvania Electric Products, Inc., a corporation of Massachusetts Application December 23, 1954, Serial No. 477,161

11 Claims. (Cl. 315—13)

This invention relates to cathode ray tubes and systems for use in connection therewith. More particularly, the invention relates to cathode ray tube structures and associated circuitry providing automatic control means for correcting, substantially instantaneously, unintended deviations of an electron beam or beams from a predetermined scanning pattern.

The invention is of particular utility for use with cathode ray tubes and associated circuitry where the formation of a raster of successively scanned lines, as in television, is desired. While the invention may be used in systems for reproduction of monochrome television pictures, it has particular utility in the field of color television in systems which employ cathode ray tubes in which the picture writing beam traverses multi-color striped or mosaic line screens. In such systems deviation of the scanning spot from its intended scanning path along a particular line element of the screen results in color contamination of the picture being generated on the face of the cathode ray tube. The picture distortion resulting from such errors is noticeable and therefore objectionable.

The invention also has utility, for example, in the reproduction of three dimensional television pictures in which the picture is formed by scanning polarized or colored elements and in which optical combination of the images so produced is accomplished by using filter glasses worn by the viewer. However, in order to simplify the presentation of the invention, the discussion and drawings herein will be limited to the field of color television, it being understood that the invention may be equally well applied to monochrome or three dimension television systems.

Color picture reproduction systems employing only one picture tube may be broadly divided into two categories: those which require picture tube structures having complex internal mechanical structures producing one or more beams directed at the face of a tube bearing color phosphors or filters arranged in finely divided, symmetric, mosaic-like patterns; and those in which one or more electron beams directed towards the face of a cathode ray tube, excite variously disposed color phosphors and, at the same time, cause the picture producing area to generate information, which, when analyzed by outside circuitry, is utilized to control the position of the beam.

Tubes in the first category are difficult to manufacture, for the beam generating and beam directing structures which must be included within the evacuated envelope must be built to high mechanical tolerances in order to insure accurate incidence of the beam upon the desired particulate area of the phosphor. Such tubes contain large masses of materials which are difficult to outgas, resulting in a required period of evacuation much greater than that ordinarily employed in the manufacture of black and white television picture tubes. Factors such as these contribute substantially to high costs in the finished product.

Tubes in the second above-named general category of color television picture reproducing devices are, in general, easier and cheaper to make, since the beam locating function is taken over by outside circuitry and the mass of structure within the vacuum tube envelope is considerably reduced.

It is an object of the present invention to minimize the above-mentioned disadvantages in a new cathode ray tube and cathode ray tube scanning system of the indexing type in which one or more cathode ray beams are directed onto a screen, in which, in accordance with information generated at the screen and related to the instantaneous beam position, the beam or beams are scanned across the screen in a precisely controlled pattern.

Various methods have been previously proposed for obtaining and utilising information as to instantaneous position from the face of a cathode ray tube. These methods variously suffer from one or more of the following deficiencies: undesirable variations in the beam position information generated at the face of the tube caused by the presence of video modulation upon the scanning beam; complex structures for sensing beam position; high linearity scanning systems having errors in scan velocity and raster dimensions of less than 1%; and complex circuits for utilizing the instantaneous beam position information and applying it to the beam scanning systems to correct for beam position error.

An object of the present invention is to provide a television reproduction system substantially free of the aforementioned difficulties.

The present invention resides in an improved television picture reproducing system in which a number of moving electron beams are maintained in substantially exact registration with a like number of lines in a line phosphor screen. Signals generated in response to movement of one of the beams over the screen are employed to control and maintain registration of the beams with the lines in the screen. According to another feature of the invention, information derived from movement of a beam over the screen not only maintains the desired registration but also controls the production of successive scanning lines to form the television picture raster.

In one embodiment of the invention, a picture producing cathode ray tube is provided with a lined screen made up of groups of parallel elements which are capable of producing light outputs of differing character when excited by incident electrons. The screen is also provided wiht parallel control or "index" signal generating facilities responsive to excitation by electrons for generating information describing the instantaneous registration of a beam on the screen. One of the features of the invention is the provision of an electron beam, maintained free of video modulation, which cooperates with the signal generating facilities to produce beam registration information. Other cathode ray beams are provided equal in number to the picture producing elements in a group, a beam being associated with each such element. The beam for generating the beam position information and the beams for exciting the picture producing elements are moved together so as to successively traverse the length of each group of picture producing elements, the generated registration information being utilized to maintain registration of the beams on the phosphors.

According to a further aspect of the invention, the same registration information may be accumulated and utilized to control the actual production of the raster. Other features of the invention relate to means for starting and stopping the scan of each picture frame by generating and utilizing further registration signals.

Other features and objects of the invention relate to elimination of convergence problems in cathode ray picture tubes in which high efficiency is obtained through the use of multiple beams, and in which, at the same time, the required deflection fields are easily supplied.

The novel features considered characteristic of this invention are set forth in the appended claims. The invention itself, however, will best be understood from the following description and from reference to the accompanying illustrative drawings of the application of the invention in color television receiver environments.

Figure 1:
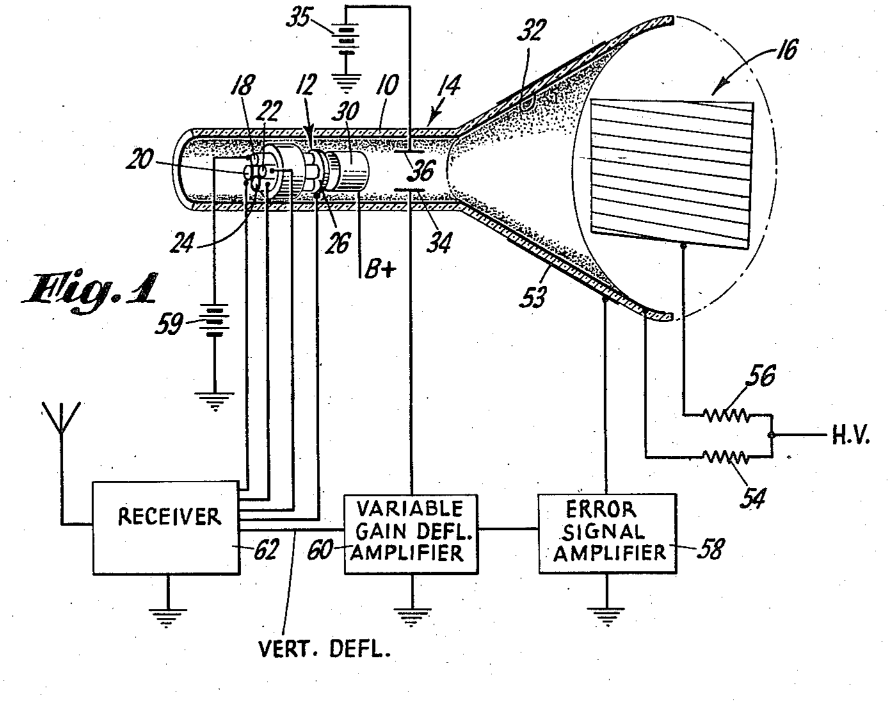
Fig. 1 is a partly schematic and partly diagrammatic showing of a color television receiver system according to one aspect of the invention.
Figure 3:
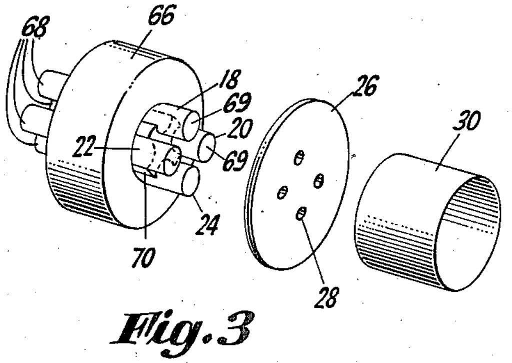
Fig. 3 is a simplified exploded view of the electron beam generating and modulating portion of the electron gun utilized in the cathode ray tube of Fig. 1.

The cathode ray tube employed in the illustrated embodiment of the invention as shown diagrammatically in Fig. 1 includes an evacuated envelope 10 having: multiple beam generating gun 12, deflection system 14 located down the neck of the tube from the gun 12; and picture display and index signal generating screen 16 occupying this opposite enlarged end of the tube and mounted either directly on the glass face of the tube, as shown, or on a plate held behind the face of the tube, as is known in the art. The electron gun 12, as may be seen in Fig. 3, is provided with separate cathodes 18, 20, 22 and 24, control grid 26 having apertures 28 associated with the face of each of the four cathodes, and an accelerating anode 30. Each of the cathode, grid and anode groups, so to speak, functions as a gun in the usual way and so generates an electron beam. Further acceleration of the beams is accomplished by second anode 32 which, in the illustrative embodiment, comprises an aquadag coating applied to the surface of the inner wall of the cathode ray tube in a manner already well understood in the art.

In the preferred embodiment of the invention, the gun structure 12 is so oriented, relative to the screen 16 of the tube that the beam from cathode 18 is uppermost, with the other beams spaced, upon arrival at the screen, at equal intervals below it, so as to fall on separate phosphor strips. Dashed lines are used in Fig. 2 to indicate the manner of arrival of beams 18′, 20′, 22′ and 24′ at the screen 16. The beams 18′, 20′, 22′ and 24′ originate at the corresponding cathodes 18, 20, 22, and 24 respectively, and, due to the small intercathode spacing of the gun, are all easily scanned together by the same deflecting means 14 without substantial change in their relative positions over the face of the tube. In the case of 20 inch picture tube, for example, suitable phosphor strip widths would be 0.006 inch, suitable spot sizes 0.003 inch. The maximum beam dimension would therefore be 0.024 inch, a dimension comparable to the thickness of the beams now used to produce a monochrome picture tube.

In the illustrations, the deflection system is purposely abbreviated, showing only the vertical deflecting plates 34 which are used to accomplish vertical deflection of the beams generated by the gun 12. Horizontal deflection of the beams may be accomplished by a similar set of plates conventionally disposed perpendicular to the vertical plates (not shown) in a manner already well known in the art. In systems where magnetic deflection is desirable, deflecting coils and appropriate circuitry may be substituted.

Figure 2:
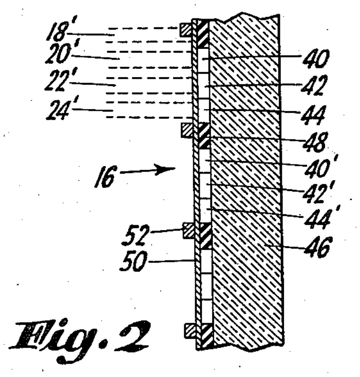
Fig. 2 is a view in cross section of a section of the fluorescent screen utilized in the system as set forth in Fig. 1.

Detail of picture display portion or screen 16 of the cathode ray tube may be seen in Figs. 1 and 2. In tricolor television systems the screen 16 preferably comprises repeated groups of essentially horizontally disposed color phosphor strips 40, 42, and 44, 40′, 42′ and 44′, etc. on glass tube face 46. A given group of horizontal phosphor strips 40, 42, 44, which in one embodiment of the invention may be red, green, and blue, respectively, is spaced from the adjacent group 40′, 42′, 44′ by means of a band of insulating material 48. A backing layer 50 of aluminum film, for example, is laid over the phosphor strips and insulating bands. A series of indexing strips 52 are applied, in turn, over the aluminum coating 50, and are composed of a material having a different secondary emissive characteristic than aluminum coating 50. Each of the indexing strips is preferably half as wide as the inert strips 48 and, in the preferred form of the invention, is laid along the upper edge of the associated strip 48 as will be seen in Fig. 2.

It will be understood that in monochrome systems only the usual phosphor screen coating used need by employed, and that in tridimensional systems a pair of picture elements would be placed between each indexing strip, it being further understood that in both cases suitable index strip arrangements be provided. Similarly, in the monochrome case, only one writing beam need be produced by the gun, and, in the tridimensional case, two writing beams are required. Other combinations for other types of picture production will occur to workers skilled in the art according to their particular requirements.

A signal collector electrode 53 for sensing voltage changes on anode 32 produced by variations in secondary emission current resulting from bombardment by the electron beams is located on the outside of the tube adjacent second anode 32. It preferably takes the form of a hollow, truncated conic section, and is capacity coupled through the envelope to anode 32. The signal collecter electrode may take the form of a conducting coating applied to the glass in a manner well known in the art.

Figure 4:
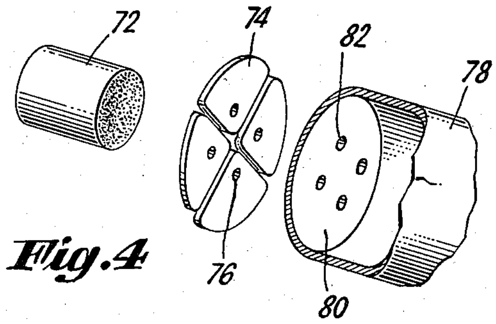
Fig. 4 is an exploded view of an alternated form of construction of the electron gun for use with applicant's invention.

In the illustrative embodiment of Fig. 1, the picture tube 10 is provided with color signals by color receiver 62, three color difference signals being individually applied to the cathode ray tube of Figs. 1 and 4 at the cathodes 20, 22, and 24. The cathode 18 provides a steady current beam for generation of the indexing signal, being operated at a fixed bias by battery 59. Blanking of the four beams during retrace may be accomplished by means of a receiver-supplied blanking impulse applied to grid 26 in the conventional manner. and brightness control is accomplished by supplying the grid with the brightness component of the color signal. Receiver 62 supplies the necessary vertical scanning waveform to the variable gain, vertical deflection amplifier 60.

Beam accelerating potentials are applied to second anode 32 and screen 16 (aluminized layer 50) by means of dropping resistors 54 and 56, the voltage drops across the resistors being so proportioned that the potential applied to the screen 16 is less than that applied to the anode 32. In the case of a 20 inch cathode ray tube, a potential difference of 1000 v. is satisfactory.

The index signal pickup connection is made from pickup electrode 53 to error signal amplifier 58, the amplified error signal voltage from amplifier 58 being applied to the variable gain vertical deflection amplifier 60 to control the amplitude of the vertical deflection voltage applied to the scanning plates 34.

In operation, the four beams generated by the gun 12 strike the screen 16 so that the beam 20′ from the gun to which the red color difference signal is supplied, shown here as cathode 20, is directed onto the red phosphor 40. Similarly, the green controlled beam 22′ strikes green phosphor strip 42 and the blue controlled beam 24, strikes blue phosphor strip 44. The index beam 18′ falls half on index strip 52 and half on the aluminum backing 50. As the group of beams is scanned across the face of the tube, the spots tend to move slightly diagonally relative to the lines of the screen due to the slant applied to the screen 16 relative to the direction of horizontal scan. This slant is indicated in an exaggerated fashion by the slope of the index lines 52 relative to the horizontal in Fig. 1. The index beam 18' therefore tends to ride further onto the particular emissive strip 52 with which it is engaged. The resulting increased impact of the beam 18' on index strip 52 results in an increase in the rate of secondary electrons produced by the strip and collected by the second anode 32. The resulting increased current flow through resistor 54 produces a drop in potential of anode 32 which is capacitatively sensed by collector 56. The voltage variation of collector 56 is amplified by the error signal amplifier 58 and fed to the variable gain vertical deflection amplifier 60 as an error voltage. The error voltage, applied to the amplifier 60, changes the gain of the amplifier so as to correct the spot position. In the instant case, the error signal voltage increases the gain of the amplifier, resulting in an increase in the deflection voltage applied to plate 34 of the deflection system. Increased downward deflection of beam 18' results and, since the augmented deflection is proportional to the error, the beam position is corrected. Similarly, if too little index signal is generated as a result of the spot being too far off of the index strip, the gain of amplifier 60 is reduced. The beam takes a higher position as it is driven into the slanting strip and the error is thus corrected. With the pilot beam 24 thus caused to track along successive secondary emissive index line strips 52, the beams 20', 22' and 24' track along their associated color phosphor strips 40, 42 and 44. Blanking of the four beams, occurring during retrace, stops the generation of error signals during beam repositioning, thus allowing the receiver-derived scanning waveforms to reposition the beams at the top of the picture preparatory to the next frame scanning cycle. Adjustment of the apparatus to insure proper operation to produce rasters controlled by the secondary emission strips, and so to produce tracking of the color beams on the color phosphors, may be simply accomplished by varying the average gain setting of the variable gain vertical deflection amplifier to obtain approximate vertical coincidence of the scanning lines and the index strips and by varying the tilt of the index strips with respect to the scan horizontal so as to insure that the index spot runs into index strips in the proper degree.

More detailed views of gun structures suitable for ease in the cathode ray tube of Fig. 1 may be seen in Figs. 3 and 4. In these figures skeleton, exploded views of the gun structures are shown for simplification of the illustrations and electrode spacing and holding structures have been omitted. Such structures may be readily provided in accordance with techniques presently well known in the art.

Referring now to Fig. 3 it will be seen that separate cathodes 18, 20, 22, and 24 are maintained electrically separate from one another and yet associated in close relationship by means of the grooved insulating block 70. In this embodiment of the invention, an insulated heater coil 66 is wrapped around the bundle of cathodes to provide a common source of heat. The cathode cylinders 18, 20, 22 and 24 may be solid metal, or may be hollow. Separate leads 68 are provided for connections to individual cathodes. The grid disc 26 is spaced apart from the emissive cathode surfaces 69 on the ends of the cathodes 18, 20, 22, and 24 and is provided with four apertures 28 opposite the cathodes for controlling the beam current in a manner well understood in the art of electron optics. Spaced axially down the tube from the grid is a cylindrical first accelerating electrode 28 constructed and positioned according to the laws of electron optics for accelerating the electron beam as they emerge from the grid apertures. Other forms of accelerating electrodes may be used, of course, a suitable alternative being illustrated in Fig. 4.

The actual dimensions and spacings of the cathode grid and anode elements are governed by well known principles of electron optics and need not be discussed here, it being understood that the principal controlling factor is that the ultimate spot size and disposition at the screen must conform to the conditions already set forth.

An alternative form of gun construction is shown in Fig. 4, here, the gun, instead of having separate cathodes has a single cathode 72 as a source of electrons common to the four beams. Spaced away from the cathode so as to be insulated therefrom, and from each other are four wedge-shaped grid electrodes 74 which have their apices approaching the axis of the tube. Near the apex of each wedge 74 are beam forming apertures 76. The spacings between the apertures 76 is determined by the spot pattern desired on the screen. Located on the other side of the grid assembly from the cathode 72 is cylindrical accelerating electrode 78 which is provided with an accelerating grid formed of end wall 80 on the end of the cylinder nearest the grids, the grid having suitable apertures 82. As will be observed from the nature of the guns employed in the above illustrations, electron guns for use in the invention are designed according to well understood principles of electron optics, it being required in addition, however, that the beams be placed close together so that for deflection purposes they may be treated as one.

Application of operating potentials to the gun of the tube of Fig. 4 is accomplished in a manner similar to that employed for the application of operating potentials to the gun of Fig. 3, except that the video signals are applied to three of the grid sectors, while the fourth grid sector is biased at a fixed potential to provide a steady current indexing beam. The blanking signal and the brightness component of the color signal are then applied to the cathode.

Alternative methods of supplying signals to this gun as well as to the gun of Fig. 1 may be employed when desirable as is already well known in the art.

Figure 5:
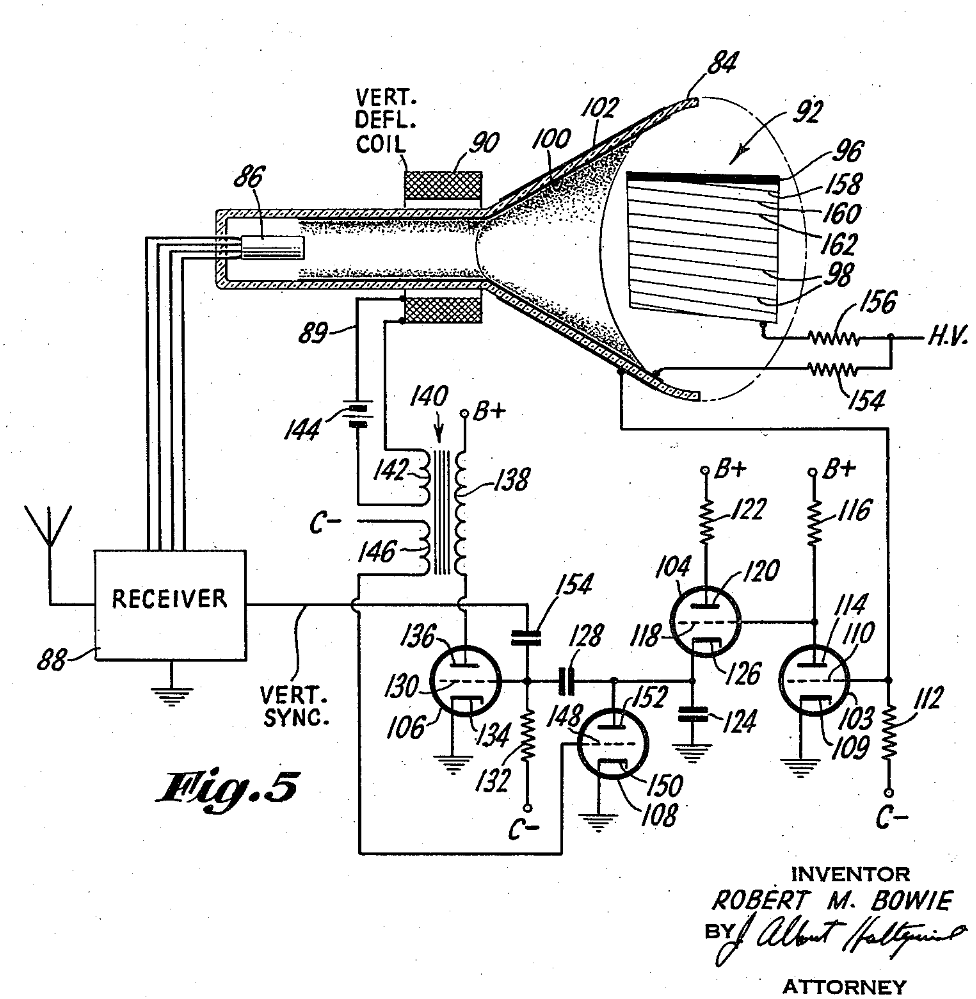
Fig. 5 is a partly schematic and partly diagrammatic showing of an alternative embodiment of the picture tube employed in an alternative scanning system.

Fig. 5 illustrates an alternative embodiment of the invention in which signals from the indexing strips of tubes built according to the preceding teachings operate to control the vertical scan generation directly. The tube 84 of Fig. 5 is in most respects identical with that of Fig. 1 and may employ either of the guns shown in Figs. 3 and 4. As before, the gun 86 is adapted to provide four electron beams aimed at the screen, the uppermost of which is a steady current indexing beam and the other three of which are directed at the color phosphors they are to excite. Deflection of the beams is accomplished, as before, by a conventional deflection structure 88 which is illustrated here as having a vertical deflection coil 90, it being understood that horizontal deflection coils and circuitry are required and may be supplied in accordance with the prior art. The screen 92 is similar to the screen of Fig. 1 with the exception of secondary emissive strip 96 laid across the top of the active screen picture area. The strip 96 is much wider than the indexing strips 98 and assists as starting the vertical scan, as will be seen below. It also serves as a point of origin for the interlaced index lines at the top of the screen. The tube is provided with a final accelerating anode 100 and has external electrode 102 capacity coupled through the wall of the tube to the anode as before.

The scanning circuit serves a dual purpose: generation of the vertical sweep and generation of a correcting voltage for improving the instantaneous vertical position of the beams. These functions are accomplished by controlling the rate of charge of a condenser by means of index signals generated by the sweeping index beam, controlling the current through the vertical scanning coil proportionally to the charge on the condenser, and correcting the rate of charge as a function of beam position error.

The circuit in which the above functions are accomplished employs index signal amplifier tube 103, vertical scan control tube 104, scan voltage amplifier 106 and return trace control tube 108. Amplifier tube 103, shown here as a triode, has its cathode 109 grounded, its grid 110 connected to the picture tube index signal pickup electrode 103. Grid 110 is connected through grid impedance 112 to a source of negative bias. Anode 114 of tube 103 is provided with plate load resistor 116 and is connected through resistor 116 to a conventional plate supply.

Voltage variations developed across load resistor 116 are coupled directly to grid 118 of the vertical scan control tube 104. Anode 120 of tube 104 is connected through resistor 122 to a source of plate supply voltage and condenser 124 is connected between cathode 126 and ground. By this arrangement, the internal resistance of tube 104 is placed in series connection between the plate supply, plate load resistor 122, and condenser 124 and current flow into condenser 124 through tube 104 may be controlled by varying the internal resistance of tube 104 through control grid 118. The voltage appearing across condenser 124 is coupled to grid 130 of tube 106 by means of coupling condenser 128. Grid 130 is biased to a suitable negative potential by connection through grid resistor 132 which is connected to a source of negative bias. Cathode 134 of amplifier tube 106 is grounded and anode 136 is connected to a source of plate supply voltage through primary winding 136 of sweep transformer 140. The output of transformer 140 is coupled by means of winding 142 through a source of bias current 144 to vertical deflection coil 90 on the neck of the cathode ray tube. As will be seen, bias current source 144 provides a permanent fixed deflection to the picture tube beams. A voltage is fed back from sweep transformer 140 by means of tertiary winding 146 to grid 148 of return trace control tube 108. Grid 148 is maintained at a negative potential with respect to cathode 150 of tube 108 by means of connection of the free end of winding 146 to a suitable source of negative bias voltage. Anode 152 of return trace control tube 108 is connected to cathode 126 of the vertical scan control tube 104. Vertical synchronizing voltages are supplied to the circuit by means of a connection from receiver 88 through coupling condenser 154 to grid 130 of scan voltage amplifier 106.

Operation of the tube and circuit is as follows. The four beams generated by cathode assembly 86 are biased up to the top of the picture area by the steady state current flow through vertical deflection coil 90, produced by battery 144. At the start of the picture, the index beam current is switched on by removing the blanking signal supplied as in conventional practice. The positioned index beam thus strikes the broad secondary emissive strip 96 at the upper edge of the picture and, regardless of lateral position on strip 96, starts flow of secondary emission current to anode 100 through resistor 154. Flow of secondary electrons from emissive strip 96 to anode 100 is facilitated by the difference of potential maintained between screen 92 and anode 100 by the dropping resistors 154 and 156. Anode 100 experiences an instantaneous voltage drop proportional to the secondary emission current which is sensed by capacity coupled pickup electrode 102 and applied to grid 110 of amplifier tube 102. The instantaneous drop at grid 110 is reproduced as an instantaneous voltage rise at anode 114, and so at grid 118 of tube 104. The rise in potential of grid 118 of tube 104 permits a rise in current flow in tube 104 and, accordingly, an increase in current flow into condenser 124. The resulting upward change in the potential appearing across condenser 124 is coupled to grid 130 of amplifier tube 106 by coupling condenser 128. The resulting rise of voltage on grid 130 in turn permits increased current flow in the plate circuit and causes an increase in current flow through primary winding 138 of scan transformer 140. The enhanced current flow in primary winding 138 is coupled to secondary winding 142 where it tends to reduce the flow of steady state deflection current produced by bias battery 144. The reduction in deflection current thus effected results in downward deflection of the pivot beams. As the rate of downward travel of the beam is proportional to the generated secondary emission current, the beam travels downward until it begins to leave the strip 96. As the beam leaves the strip, the rate of generation of secondary emission current is reduced, and so the rate of downward deflection is reduced. There the beams tend to dwell until such time as the horizontal scan voltage causes them to strike one of the sloping horizontal scan index strips 98 which are connected to the lower edge of the broad scanning strip 96. It will be noted that one of the scan index lines 158 is connected to the broad starting strip 96 at the center and that other scan index strip 160 is connected to the broad starting strip at the edge of the picture area defined by all of the index strips 98. This arrangement provides an index screen useful for operation with interlaced picture signals of the sort now ordinarily transmitted by television broadcast stations.

Assuming, for the sake of explanation, that the pilot beam has impinged upon index strip 158, it will be seen that secondary electron flow will be increased as a result of interception of the beam by index strip 158. Downward motion of the pilot beam again results as a consequence of the increased current flow, and as the pilot beam is driven horizontally by the ordinary horizontal deflection process, the pilot beam is caused to track downwards along the index strip. At this point in the cycle, timing circuits in the receiver unblank the remaining beams, permitting them to produce the elements of a color picture in the manner already set forth.

If during scan of the index strip, the vertical deflection should be too small, the pilot beam will run onto the index strip and an increase in secondary electron current will result and the rate of charge of condenser 124 will be increased. Similarly, if the pilot beam should be deflected downward too fast, tending to run off of the index strip, the secondary emission current generated by the beam impact upon the index strip would be reduced, resulting in a reduction in the rate of charge of condenser 124 and reduced downward deflection of the beam, then further horizontal deflection of the beam would restore the pilot beam to its proper position relative to the index strip due to the gradual slope of the strip and consequent eventual interception of the beam.

At the end of the trace of the half index strip 158, the normal horizontal return trace blanking of the beams is accomplished by the receiver, and the horizontal return of the beams is accomplished in the usual manner by the horizontal deflection circuit. The index and picture beams are again turned on, and, with the application of horizontal scan voltage, begin to scan across the face of the tube once more. The pilot beam, whose starting position is controlled by the charge on condenser 124 at the end of scan of the previous line, now intercepts index strip 162, the leading edge of which is on a level, approximately, with the lower end of index line 158, and correct placement of the next line of this frame of the picture is assured. The production of succeeding alternate lines of the raster is similar to the process already described with the beam eventually traversing a complete set of alternating lines to form the picture raster. A sufficient number of index lines must be provided to accommodate the maximum number of lines to be scanned in the raster, and extra lines should be preferably included to permit completion of the raster without exhausting the supply of lines and permitting the last few picture lines to be scanned over each other at the bottom of the screen.

Return of the scanning beams to the top of the screen is accomplished by blanking the pilot and writing beams, and applying the synchronizing pulse from receiver 88 to grid 130 of tube 106. The effect of the negatively polarized synchronizing pulse is to reduce the flow of current in tube 106 and primary winding 138. The downward change in current in primary winding 138 is coupled through winding 142 to vertical deflection coil; and reversal in current flow begins, starting the return trace of the beam. A positive pulse is also developed in tertiary transformer winding 146 and is applied to grid 148 of return trace control tube 108, turning tube 108 on. Turning on tube 108 accomplishes the double purpose of discharging condenser 124 by means of the conductive path now provided through tube 108, and of reducing the potential on grid 130 of scan voltage amplifier 106. The latter function is accomplished due to the reduction in potential of anode 152 as a result of current flow, anode 152 being coupled to grid 130 by condenser 128. Further reduction in current flow in tube 106 and transformer 138 results, and the process begun by the synchronizing pulse is reinforced, driving tube 108 into a more conductive condition. The process, once started, continues, rapidly augmenting the reversal of current flow and reestablishing flow of the original biasing current which positions the beam at the top of the raster. Meanwhile condenser 124 is discharged and put in condition to start anew its vertical scan generation function. The raster scanning process then starts again with initial unblanking of the pilot beam and process as before, except that during this second frame, the other set of index strips starting with strip 160 is used, providing the customary interlaced television raster. The manner in which the interlaced raster is produced is well understood in the art, being controlled by signals transmitted along with the picture in the transmission process. The staggered starting lines 158 and 160 are provided to accommodate picture signals so transmitted.

As will be observed, the illustrative embodiments set forth above describe television raster production systems in which the path to be taken by one or more picture writing beams is, to a large extent, determined in advance by a pattern of index strips associated with the reproducing screen. The shape, configuration, and structure of the index strip pattern is, of course, capable of variation to suit the needs of a particular situation. Other embodiments and variations in the structure and circuitry will be envisaged by workers skilled in the art. It is to be understood, therefore, that the embodiments of the invention should be considered as illustrative rather than limiting in their effect upon the construction of the below appended claims.

I claim:

1. In a color television system: a multi-color kinescope having a luminescent screen including a multiplicity of horizontal parallel groups of parallel phosphor strips, the various strips in a group being capable of producing light of a plurality of component color image in response to excitation by electrons, said screen also having control signal generating elements aligned with said groups of phosphor strips; and means for producing a number of electron beams, one of said beams being an index beam and the others of said beams being modulated with video intelligence; means including a periodic wave generator for deflecting said beams together along said phosphor strips; and means responsive to signals generated by the impact of said index beam on said control signal generating elements for maintaining said control beam in contact with successive control signal generating elements during scan of a raster.

2. The color television system of claim 1 in which said means responsive to impact of said index beam on said signal generating elements includes means effective to maintain the vertical position of said beam relative to the signal generating element just traversed during horizontal repositioning of the beam prior to scan of the next succeeding signal generating element.

3. In a color television system: a multi-color kinescope having a luminescent screen including a multiplicity of groups of phosphor strips, the various strips in a group being capable of producing light of a plurality of component image colors in response to excitation by individual electron beams, said screen also having control signal generating elements aligned with said groups of phosphor strips forming a grid, means for generating a number of electron beams for exciting said light producing phosphor strips; and means for generating index beam for exciting said control signal generating elements; means for simultaneously deflecting said electron beams along said strips; and means connected to said grid and responsive to excitation of said control signal generating elements by said control signal generating beam for maintaining said electron beams on said phosphor strips.

4. A color television system including: a multi-color kinescope having a luminescent screen including a multiplicity of groups of phosphor strips, the various strips in a group being capable of producing light of a plurality of component image colors in response to excitation by electron beams, said screen also having control signal generating elements aligned respectively with said groups of phosphor strips and means for producing an index beam and for producing a number of video modulated electron beams; scanning means for directing said index beam successively onto said control signal generating elements and simultaneously directing said modulated beams onto adjacent phosphor strips; means including a periodic wave generator for effecting deflection of said beams in a cyclically recurring pattern along the lines of said phosphor strips; and means responsive to variation in the signal generated by a given control signal generating element under excitation by the index beam for tracking said index beam along said given element during the period of traverse of said given element.

5. The color television system of claim 4 in which said signal responsive means includes means for moving said index beam away from said given control signal generating element to another control signal generating element at the completion of the scan of said given signal generating element.

6. The color television system of claim 4 in which said scanning means includes means for accumulating the signal generated by the traversal of said given control signal generating element during said period of traversal.

7. A television system including a kinescope having: a luminescent screen, a plurality of parallel control signal generating elements across said screen and means for producing an index beam and at least one video modulated electron beam; means including a periodic wave generator for effecting deflection of said beams in a cyclically recurring pattern substantially along, but directed into said parallel control signal generating elements; and means respective to error signals generated by one of said control signal generating elements as a result of excitation by said index beam for maintaining said index beam in contact with said given control signal generating element during traversal of said element, said last named means including means for accumulating said error signals, and means for maintaining elevation of the index beam relative to the end of said given control element to position said index beam for starting traversal of the next successive control element.

8. In combination, an image screen provided with a plurality of substantially parallel, separated, elongated elements, certain elements being image producing elements, other elements being indexing signal producing elements, said image and control elements being interlaced in an alternating pattern; means to produce an indexing electron beam and at least one image electron beam; and means to direct said beams upon said screen, said beams, when striking said screen, having a separation at which when the indexing beam is in registration with any indexing element, the image beam is in registration with an image element immediately adjacent said any indexing element.

9. In combination, an image screen provided with a plurality of substantially parallel, separated, elongated elements, certain elements being image producing elements, other elements being indexing signal producing elements, said image and control elements being interlaced in an alternating pattern; means to produce an indexing electron beam and at least one image electron beam; and means to direct said beams upon said screen, said beams, when striking said screen, having a separation at which, when the indexing beam is in registration with any indexing element, the image beam is in registration with an image element immediately adjacent said any indexing element, said any indexing element, when the indexing beam is in faulty registration therewith in a direction substantially perpendicular to the direction in which said elements extend, producing an indexing signal which is indicative of faulty registration.

10. The combination as set forth in claim 9, further including means responsive to said faulty registration indexing signal to move said indexing beam into proper registration with said any indexing element.

11. In combination, an image screen provided with a first plurality of substantially parallel, separated, elongated elements, certain elements being image producing elements, other elements being indexing signal producing elements, said image and control elements being interlaced in an alternating pattern, each image element comprising a second plurality of substantially parallel, separated, elongated phosphor strips having different light emissive properties, each strip being substantially parallel to the indexing signal producing element associated with said each image element; means to produce an indexing electron beam and a second plurality of image electron beams; and means to direct said beams upon said screen, said beams, when striking said screen, being separated from each other in a manner at which when the indexing beam is in registration with any indexing element, the image beams are in registration with corresponding phosphor strips of an image element immediately adjacent said any indexing element.

References Cited in the file of this patent

UNITED STATES PATENTS

| | | |
|---|---|---|
| 2,577,038 | Rose | Dec. 4, 1951 |
| 2,587,074 | Sziklai | Feb. 26, 1952 |
| 2,593,261 | Buchanan | Apr. 15, 1952 |
| 2,630,548 | Muller | Mar. 3, 1953 |
| 2,631,259 | Nicoll | Mar. 10, 1953 |
| 2,644,855 | Bradley | July 7, 1953 |
| 2,735,031 | Woodbridge | Feb. 14, 1956 |
| 2,761,089 | Haeff | Aug. 28, 1956 |